United States Patent
Boutaghou et al.

(10) Patent No.: US 6,275,356 B1
(45) Date of Patent: Aug. 14, 2001

(54) FRICTION CONTROL ON HGA RAMP LOAD/UNLOAD SURFACE

(75) Inventors: Zine Eddine Boutaghou, Vadnais Heights; Aric Kumaran Menon, Bloomington, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/078,915

(22) Filed: May 14, 1998

Related U.S. Application Data (60) Provisional application No. 60/069,132, filed on Dec. 8, 1997.

(51) Int. Cl.[7] .................................................. G11B 21/22
(52) U.S. Cl. ............................................................. 360/254.8
(58) Field of Search .................................... 360/105, 106, 360/75, 254.7, 254.8

(56) References Cited

U.S. PATENT DOCUMENTS

| | | | |
|---|---|---|---|
| 4,879,836 | * | 11/1989 | Dolyny ........................................ 43/64 |
| 5,341,260 | * | 8/1994 | Jabbari ................................. 360/105 |
| 5,590,006 | * | 12/1996 | Shafe ..................................... 360/105 |
| 5,663,846 | * | 9/1997 | Masuoka et al. ....................... 360/75 |
| 5,701,219 | * | 12/1997 | Shafe ..................................... 360/105 |
| 5,743,689 | * | 4/1998 | Schlaeger ............................... 410/30 |
| 5,825,576 | * | 10/1998 | Kamerbeek ............................ 360/75 |
| 5,828,522 | * | 10/1998 | Brown et al. ......................... 360/105 |
| 5,831,795 | * | 11/1998 | Ma et al. .............................. 360/105 |
| 5,864,448 | * | 1/1999 | Berberich ............................. 360/105 |
| 5,875,074 | * | 2/1999 | Ho et al. .............................. 360/105 |
| 6,122,130 | * | 9/2000 | Boutaghou et al. .................... 360/75 |

FOREIGN PATENT DOCUMENTS 10-302421 * 11/1998 (JP) .

* cited by examiner

Primary Examiner—Jefferson Evans
(74) Attorney, Agent, or Firm—Schwegman, Lundberg, Woessner & Kluth, P.A.

(57) ABSTRACT

A disk drive system includes a base, a disk rotatably attached to the base, and an actuator assembly movably attached to the base. A ramp for loading and unloading a transducing element to and from the disk is also attached to the base. The ramp has an inclined surface and a flat surface that has a lower coefficient of friction than the surface associated with a parking detente. This is accomplished by molding features into the inclined surface and the flat surface and leaving the surface associated with the parking detent substantially smooth or featureless. This can also be accomplished using a molding process in which two materials are used. A first material will produce a coefficient of friction which is higher than the second material.

19 Claims, 5 Drawing Sheets

FRICTION CONTROL ON HGA RAMP LOAD/UNLOAD SURFACE

RELATED APPLICATION

This application claims the benefit of U.S. Provisional Application Ser. No. 60/069,132, filed Dec. 8, 1997 under 35 USC119(e).

FIELD OF THE INVENTION

The present invention relates to the field of mass storage devices. More particularly, this invention relates to a disk drive for which includes a ramp for loading and unloading the transducing head.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive is just before the disk drive shuts down. The small ceramic block is typically flying over the disk at a very low height when shutdown occurs. In the past, the small block was moved to a non data area of the disk where it literally landed and skidded to a stop. Problems arise in such a system. When disks were formed with a smooth surface, stiction would result between the small ceramic block and the head. In some instances the force due to stiction was so strong that it virtually ripped the head off the suspension. Amongst the other problems was a limited life of the disk drive. Each time the drive was turned off another start stop contact cycle would result. After many start stop contacts, the small ceramic block may chip or produce particles. The particles could eventually cause the disk drive to fail. When shutting down a disk drive, several steps are taken to help insure that the data on the disk is preserved. In general, the actuator assembly is moved so that the transducers do not land on the portion of the disk that contains data. There are many ways to accomplish this. A ramp on the edge of the disk is one design method that has gained industry favor more recently. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself. In operation, before power is actually shut off, the actuator assembly swings the suspension or another portion of the actuator assembly up the ramp to a park position at the top of the ramp. When the actuator assembly is moved to a position where parts of the suspension are positioned on the top of the ramp, the sliders or ceramic blocks do not contact the disk. Commonly, this procedure is known as unloading the heads. Unloading the heads helps to insure that data on the disk is preserved since, at times, unwanted contact between the slider and the disk results in data loss on the disk. The actuator assembly may be provided with a separate tang associated with each head suspension. The tang may ride up and down the ramp surface. In other drives, the ramp may be positioned such that the suspension rides up and down the ramp to unload and load the disk or disks of the disk drive.

In disk drives having a ramp for loading and unloading the transducing heads from the disk, it is critical to be able to control the friction between the portion of the suspension that rides up the ramp, such as a tang, and the ramp itself. It is also becoming necessary to control the friction such that portions of the ramp, such as the parking detente, have a higher coefficient of friction than other portions of the ramp. Ramps typically have a complex geometry. One commonly used cost effective way to achieve the complex geometry is to use injection molding to form the ramp from a single material. Injection molding typically uses a single polymer material to form the ramp. The surface finish of the ramp is typically controlled by the polymer used for the injection molding the part. Often, the polymer material for a ramp is selected on the basis of its thermal and mechanical stability properties rather than for other properties, such as friction. In other words, the tribology of the ramp part is usually not considered as a factor in selecting the material for injection molding of the ramp. Friction is one of many attributes associated with tribology.

Ramps typically include an inclined surface, and a parking area or detent. There may also a flat surface positioned between the inclined surface and the parking detent. A portion of the suspension, such as a tang, rides up and down the ramp when the transducer attached to the suspension is loaded onto or unloaded from the disk. To reduce wear and to reduce the amount of power associated with moving a slider up and down the ramp, it would be advantageous if the coefficient of friction was low on the inclined and the flat surfaces of the ramp. To keep the slider in its parked position, it would be advantageous if the parking area or detent had a higher coefficient of friction.

Currently it is difficult to control the tribological properties of an injection molded port, much less to control the tribological properties in a first area and a second area of the ramp. As a result, controlling the tribology at various portions of the ramp to achieve a high friction surface area and a low friction surface area is generally not considered in the molding process. Therefore, there is a problem associated with making a ramp which has a low friction surface and a higher friction surface within the limits imposed by the polymer materials and the injection molding fabrication processes currently being used.

There is a need for a ramp having a structure that prevents stiction between the suspension and the ramp. There is also a need for a ramp that has a first surface having a first coefficient of friction and a second surface having a second coefficient of friction. There is a need for a method of manufacturing a structure having a first surface having a first coefficient of friction and a second surface having a second coefficient of friction. Furthermore, there is a need for a structure that can be formed using the injection molding process. There is a need for an injection molding process and method in which the friction on the surface of a ramp used in a disk drive can be controlled without compromising the mechanical strength and integrity of the ramp. In addition, there is a need for a ramp that has the necessary thermal properties to undergo repeated thermal cycling in a disk drive. Furthermore, there is a need to have a ramp which can be made of proven materials which have very little or essentially no outgassing which would produce contaminants within the disk drive enclosure.

SUMMARY OF THE INVENTION

A disk drive system includes a base, a disk rotatably attached to the base, and an actuator assembly movably attached to the base. A ramp for loading and unloading the transducing element to and from the disk is also attached to the base. The ramp has an inclined surface and a flat surface that has a lower coefficient of friction than the surface associated with the parking detente. This is accomplished by molding features into the inclined surface and the flat surface and leaving the surface associated with the parking detent substantially smooth or featureless. This can also be accomplished using a molding process in which two materials are used. A first material will produce a coefficient of friction which is higher than the second material. Both the first and second materials may be polymer materials. If a polymer produces a surface with a very high coefficient of friction as one of the materials of the ramp, the parking detent may be eliminated. The result is a structure that has a first coefficient of friction in the parking area and a second coefficient of friction on the inclined and flat surfaces of the ramp. The first coefficient of friction is higher than the second coefficient of friction. As a result, the suspension will stay parked in the higher coefficient area, and the suspension will slide with more ease across the flat surface and the inclined surface as the suspension and transducer attached thereto are loaded or unloaded to or from the disk. Unloading is the term for moving the transducer attached to the suspension from its transducing position over the disk to the parking area. Loading the disk is the term for moving the transducer attached to the suspension from the parking area to its transducing position over the disk.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
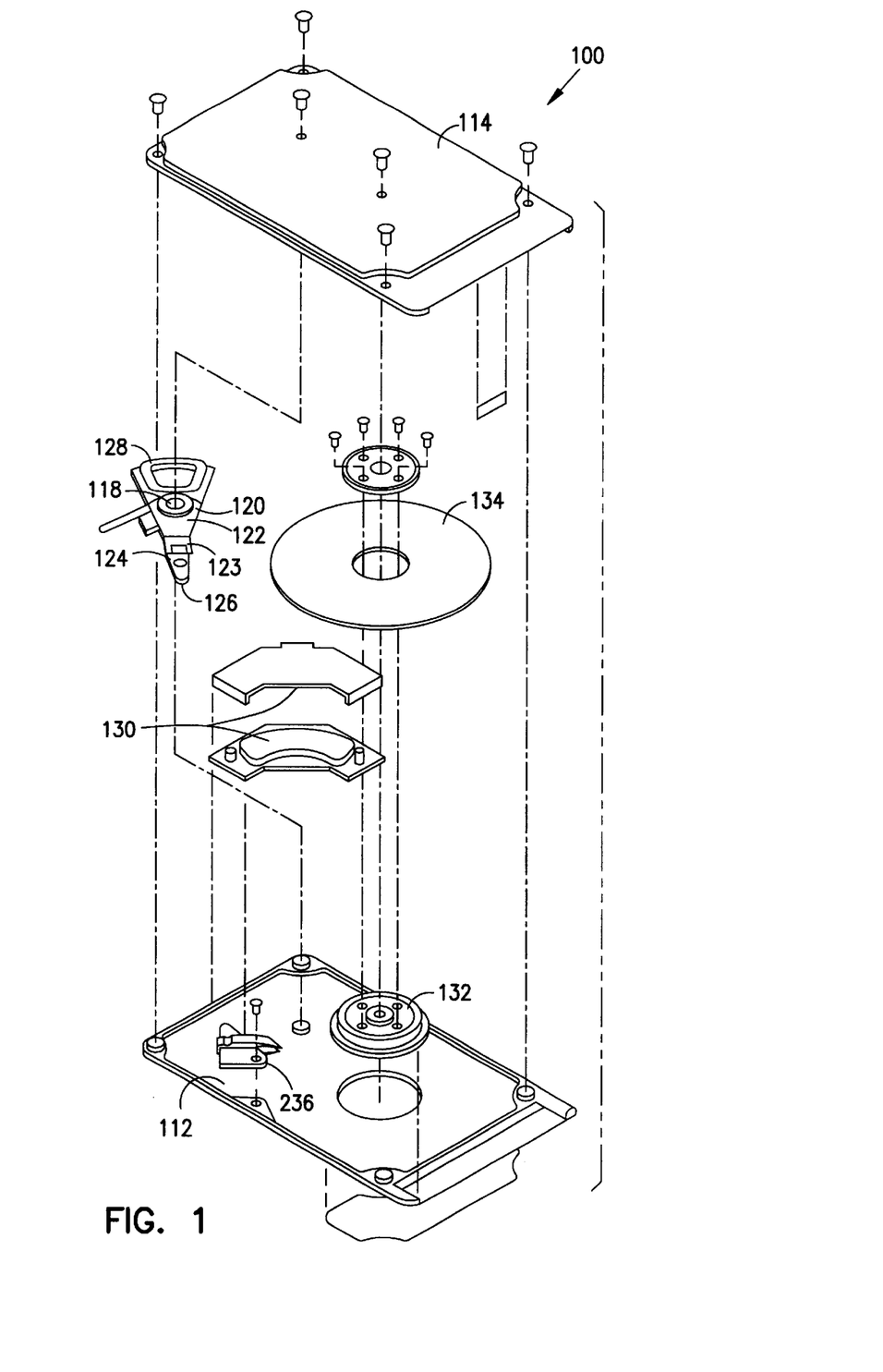
FIG. 1 is an exploded view of a disk drive.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing 112, and a housing cover 114. The housing 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the housing 112 is a pair of magnets 130. The pair of magnets 130 and the voice coil 128 are key parts of a voice coil motor which applies a force to the actuator assembly 120 to rotate it about the actuator shaft 118. Also mounted to the housing 112 is a spindle motor 132. The spindle motor 132 includes a rotating portion called the spindle hub 133. In FIG. 1, a single disk 134 is attached to the spindle hub 133. In other disk drives a number of disks may be attached to the hub. The invention described herein is equally applicable to disk drives have a number of disks attached to the hub of the spindle motor.

Figure 2:
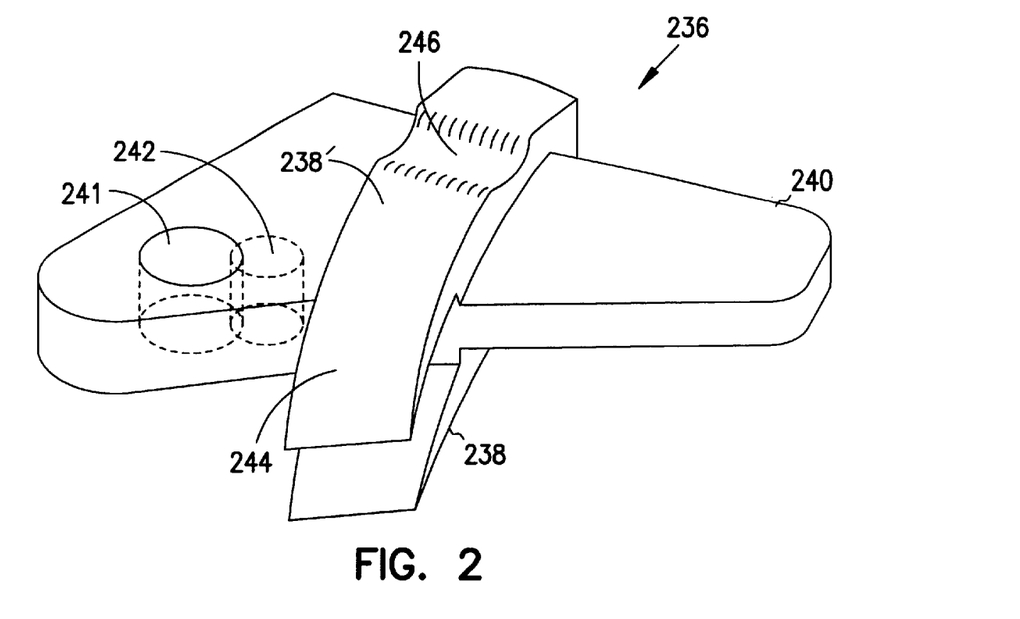
FIG. 2 is a isometric view of a ramp from a disk drive.

Also attached to the housing 112 is a ramp structure 236. Now looking at both FIGS. 1 and 2, the ramp structure has two ramp portions 238 and 238'. One of the ramp portions 238 is for the loading and unloading the transducer from the bottom surface of the disk and the other ramp portion 238' is for loading and unloading a transducer from the top surface of the disk. The ramp structure 136 shown in FIG. 2 is fixed and a portion of each of the ramp portions 238 and 238' of the ramp is positioned over the disk 134. It should be noted that this invention could also be used on ramps that rotate in and out of a load/unload position.

FIG. 2 is an isometric view detailing the ramp structure 236. The ramp structure 236 includes the ramp portions 238 and 238' and the ramp support structure 240. The support structure 240 has a first opening 241 and a second opening 242 therein which facilitate mounting the ramp 236 to a pair of corresponding pegs on the housing 112. The ramp structure 236 includes an inclined surface 244 and a parking area or detent 246. There is also a substantially flat surface 245 positioned between the inclined surface 244 and the parking area or detent 246.

Figure 3:
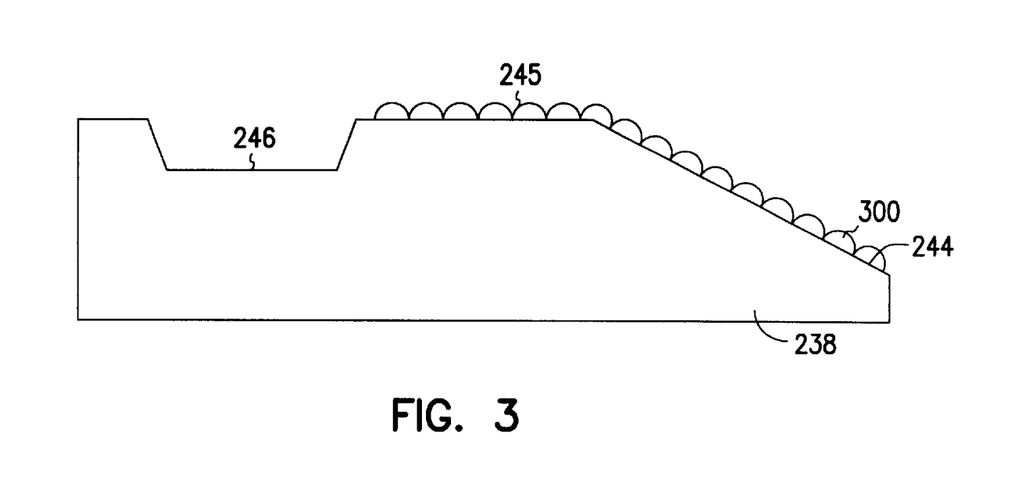
FIG. 3 is a cross sectional side view of a first preferred embodiment of a ramp having texturing features on the inclined surface and on the flat surface of the ramp.

FIG. 3 is a cross sectional side view of a first preferred embodiment of the ramp structure 236 showing one ramp 238. FIG. 3 details the inclined surface 244, the flat surface 244, and the surface of the parking area or detent 246 of the ramp 238. The inclined surface 244 and the flat surface 244 of the ramp 238 includes a plurality of texturing features 300. The surface of the parking area or detent is smooth or free of texturing features. As shown in FIG. 3, the texturing features 300 are a series of bumps or ridges incorporated into the material from which the ramp 238 is made. The texturing features actually reduce the coefficient of friction since there is less static friction or stiction between the texturing features 300 and the portion of the suspension which passes over the features 300.

The texturing features 300 are formed by designing the features into the mold used to make the ramp 238. The negative of the features is formed into the mold used to make the ramp 238. The negative of the features is placed at the portion of the mold corresponding to the inclined surface 244 and the flat surface 245. A single polymer can then be injected into the mold to form the ramp 238. It should be noted that although the features shown are closely spaced hemispherical ridges or bumps, the features can be made of any desired shape and placed in any pattern and still be within the scope of this invention. For example, the features could be hemispherical in cross section and patterned in the shape of diamond on the inclined surface 244 and the flat surface 245. The cross sectional shape and could also other than hemispherical. For example, the cross sectional shape could be triangular. The size and shape of the texturing features 300 as well as the spacing between the features will depend in part on the portion of the suspension or load beam 124 which rides over the ramp 238. For example, the spacings between the texturing features 300 will be closer when a load tang rides over the ramp 238 when compared to a design in which the main suspension or load beam 124 rides over the ramp 238. The features must be spaced so that the portion of the suspension or load beam 124 that rides over the ramp is suspended on the texturing features 300.

Rather than mold the texturing features 300 onto the inclined surface 244 and the flat surface 245, the texturing features may be attached to these surfaces 244, 245 using an adhesive. The texturing features 300 could also be placed into surfaces 244, 245 by molding processes.

Figure 4A:
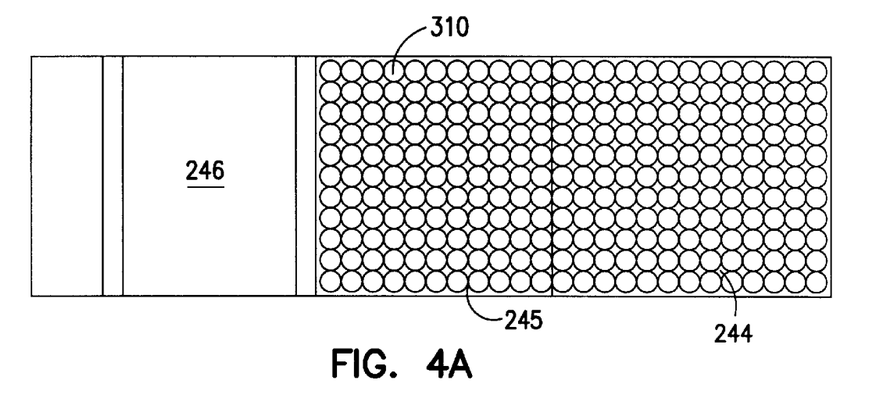
FIG. 4A is a top view of the ramp shown in FIG. 3 showing the inclined, flat and parking detent surfaces on the ramp.
Figure 4B:
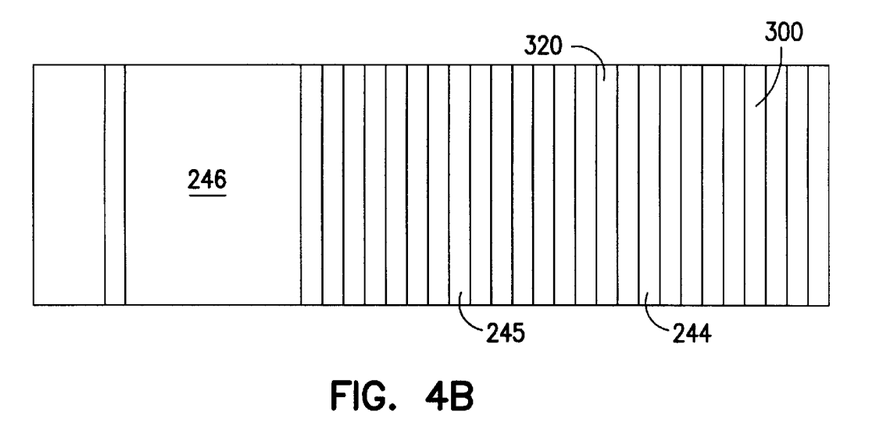
FIG. 4B is a top view of the ramp showing the inclined, flat and parking detent surfaces on the ramp.

FIGS. 4A and 4B are different top views of the ramp 238 shown in FIG. 3. FIG. 4A shows the inclined surface 244, the surface of the parking detent 246, and the flat surface 245 positioned between the inclined surface 244 and the parking detent 246. The inclined surface 244, and the flat surface 245 surface have a plurality of individual texturing features 300 that appear as individual bumps 310 on these surfaces. In FIG. 4B, the texturing features 300 are ridges 320 rather than bumps. The ridges 320 are essentially straight in FIG. 4B. It should be noted that the ridges could also be oriented at different angles as they cross the ramp. In addition, the ridges 320 could be part of a chevron shape or could be part of an S-shaped pattern.

The contact pattern and surface roughness can be controlled by changing the size of the texturing features 300, by changing the pattern which the texturing features 300 form, and by changing the spacing between texturing features 300. The size, spacing and pattern formed by the texturing features 300 can be optimized for low friction performance, wear property of the surface, and process capability of the composite material. The parking detent 245 is not provided with texturing features 300 so that the coefficient of friction will be higher in the parking detent 245. Thus, once the suspension or load beam 124 is parked in the parking detent 245 it is more apt to stay in the parking detent 245. Advantageously, the friction on the ramp 238 surfaces 244, 245 and 246 can now be controlled by selecting a texturing feature 300 for the inclined surface 244 and the flat surface 245 that will produce a lower coefficient of friction for these surfaces than for the untextured parking detent 245. The end result, is that the suspension or load beam 124 slides more easily over the surfaces 244 and 245. In addition, there is less wear on the surfaces 244 and 245 over time as multiple loads and unloads are performed. In addition, since the coefficient of friction associated with the parking detent is higher than the coefficient of friction associated with the surfaces 244 and 245. The surface of the parking detent 246 stays smooth and untextured. This aids the disk drive to keep the suspension or load beam unloaded or parked within the detent 246 even in the presence of a shock load produced by dropping a disk drive or by dropping the portable computer housing the disk drive.

Figure 5:
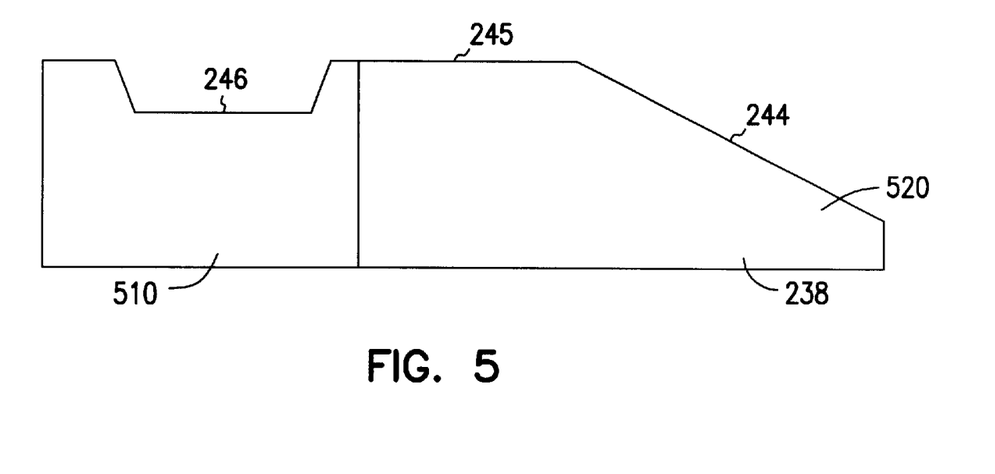
FIG. 5 is a cross sectional side view of a second preferred embodiment of a ramp having a first portion made of a first material having a second portion made of a second material.

FIG. 5 is a cross sectional side view of a second preferred embodiment of the ramp structure 236 showing one ramp 238. FIG. 5 details the inclined surface 244, the flat surface 245, and the surface of the parking area or detent 246 of the ramp 238. The ramp is made or molded from two different materials. A first portion 510 of the ramp is molded from a first material and a second portion 510 of the ramp is molded from a second material. The first portion 510 includes the parking detent 246. The first portion 510 is molded from a high friction material such as polymer which includes liquid crystal polymers. The second portion 520 of the ramp 238 is molded around or molded to the first portion 510 from a material which has a low coefficient of friction, such as Delrin, or a liquid crystal polymer available from Dow Chemical of Lansing, Mich. The second portion 520 includes the inclined surface 244 and the flat surface 245 of the ramp 238. The result is that the suspension or load beam 124 slides more easily over the surfaces 244 and 245 which is made from the lower friction material. In addition, there is less wear on the surfaces 244 and 245 over time as multiple loads and unloads are performed. In addition, the coefficient of friction associated with the first portion 510 which includes the parking detent 246 is higher than the coefficient of friction associated with the surfaces 244 and 245. This aids the disk drive 100 in keeping the suspension or load beam 124 in an unloaded or parked position within the detent 246, even in the presence of a shock load produced by dropping a disk drive or by dropping the portable computer housing the disk drive. It should be noted that there are no texturing features on the ramp 238 shown in FIG. 5. Each of the surfaces 244, 245 and 246 are smooth. To produce a ramp 238 having a lower coefficient of friction on surfaces 244 and 245, the mold could be provided with features. Wires could also be positioned near the surface of the parking detent. The wires produce an electric field. In the presence of an electric field, the liquid crystal polymers could align with the field which acts as a director to reduce the coefficient of friction along the surface of the parking detent 246. The use of liquid crystal polymers and signal carrying wires for producing an electric field is discussed in detail in copending patent application entitled Intelligent Lubricant for Ramp Load/Unload filed on a date even herewith, which is incorporated by reference.

Figure 6:
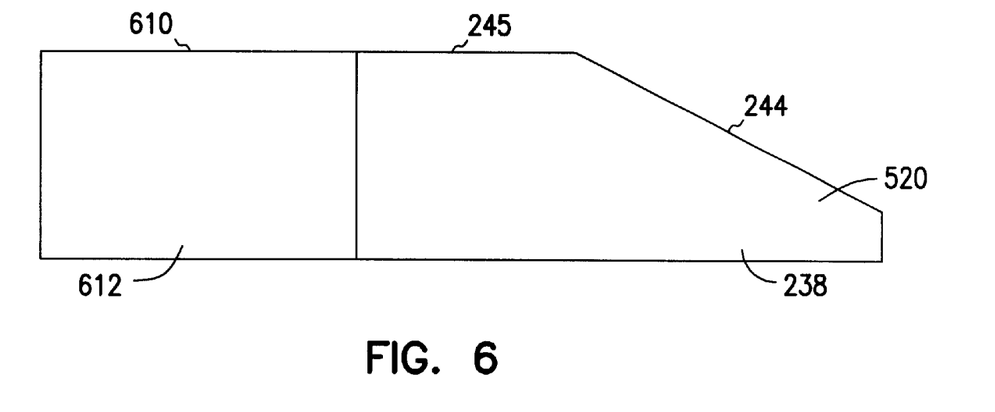
FIG. 6 is a cross sectional side view of a third preferred embodiment of a ramp having a first portion made of a first material having a second portion made of a second material.

FIG. 6 shows a third embodiment of the ramp 238. In this embodiment, the ramp 238 is made or molded from two different materials. A first portion 612 of the ramp is molded from a first material and a second portion 520 of the ramp is molded from a second material. The first portion 612 includes the parking area 610 rather than a parking detent. This is the main difference between this embodiment and the one shown in FIG. 5. The first portion 612 is molded from a high friction material such as polymer which includes liquid crystal polymers. The second portion 520 of the ramp 238 is molded around or molded to the first portion 612 from a material which has a low coefficient of friction, such as Delrin, a polymer available from Dow Chemical of Lansing, Mich. The second portion 520 includes the inclined surface 244 and the flat surface 245 of the ramp 238. The result is that the suspension or load beam 124 slides more easily over the surfaces 244 and 245 which is made from the lower friction material. In addition, there is less wear on the surfaces 244 and 245 over time as multiple loads and unloads are performed. In addition, the coefficient of friction associated with the first portion 612 which includes the parking area 610 is higher than the coefficient of friction associated with the surfaces 244 and 245. This aids the disk drive 100 in keeping the suspension or load beam 124 in an unloaded or parked position over or with respect to the parking area 610, even in the presence of a shock load produced by dropping a disk drive or by dropping the portable computer housing the disk drive. As a practical matter, the coefficient of friction at the parking area 610 must be sufficiently large to keep the suspension or portion of the suspension from sliding off. This must be balanced by the need for a larger actuator motor to overcome the higher coefficient of friction.

Figure 7:
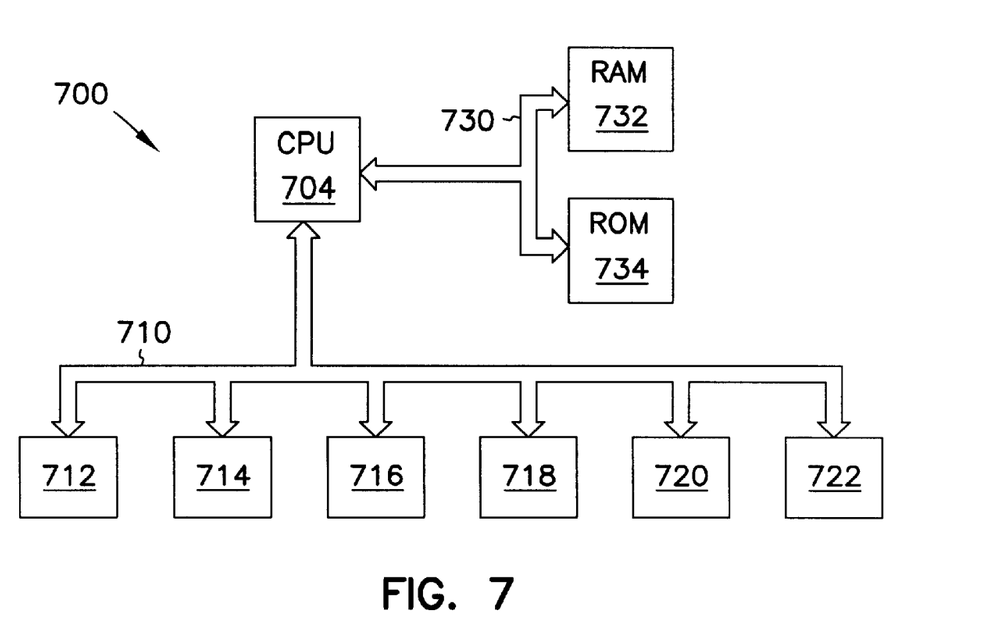
FIG. 7 is a schematic view of a computer system.

FIG. 7 is a schematic view of a computer system. Advantageously, the invention is well-suited for use in a computer system 700. The computer system 700 may also be called an electronic system or an information handling system and includes a central processing unit, a memory and a system bus. The information handling system includes a central processing unit 704, a random access memory 732, and a system bus 730 for communicatively coupling the central processing unit 704 and the random access memory 732. The information handling system 700 includes a disk drive device which includes the ramp described above. The information handling system 700 may also include an input/output bus 710 and several devices peripheral devices, such as 712, 714, 716, 718, 720, and 722 may be attached to the input output bus 710. Peripheral devices may include hard disk drives, magneto optical drives, floppy disk drives, monitors, keyboards and other such peripherals. Any type of disk drive may use the ramp having particles 300 molded therein.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:
    a ramp further including:
        a first surface having a first coefficient of friction; and
        a second surface having a second coefficient of friction; and
    means for controlling one of the first coefficient of friction or the second coefficient of friction.

2. The magnetic disk drive of claim 1 further comprising:
    a suspension which includes a portion which rides over the first and second surfaces of the ramp.

3. A magnetic disk drive comprising:
    a magnetic disk to store representations of information;
    a transducer to read representations of information from the magnetic disk;
    a suspension, said transducer being attached to said suspension; and
    a ramp positioned near said magnetic disk, said ramp further comprising:
        a parking surface having a first coefficient of friction; and
        an inclined surface having a second coefficient of friction that is lower than the first coefficient of friction.

4. The magnetic disk drive of claim 3 wherein the inclined surface further comprises a flat surface adjacent to the parking surface.

5. The magnetic disk drive of claim 3 wherein the inclined surface includes texturing features used to make the second coefficient of friction lower than the first coefficient of friction.

6. The magnetic disk drive of claim 5 wherein the parking surface is associated with a parking area of the ramp.

7. The magnetic disk drive of claim 6 wherein the parking area includes a parking detent.

8. The magnetic disk drive of claim 3 wherein the ramp further comprises:
    a first portion of the ramp which includes the parking surface; and
    a second portion of the ramp which includes the inclined surface, said first portion comprising a first material and said second portion comprising a second material, said first material having a higher coefficient of friction than the second material.

9. The magnetic disk drive of claim 8 wherein the first portion of the ramp includes a parking area.

10. The magnetic disk drive of claim 9 wherein the parking surface includes a a parking dent.

11. The magnetic disk drive of claim 8 further comprising:
an actuator, said suspension and said transducer attached to said actuator;
a base, said actuator being movably attached to said base and said magnetic disk being rotatably attached to said base; and
a cover removably attached to said base, said base and cover forming an enclosure for said magnetic disk.

12. An information handling system comprising:
a base;
a magnetic disk rotatably attached to said base;
an actuator assembly movably attached to said base;
a transducer attached to said actuator assembly, said actuator assembly being movable between a loaded position where the transducer is in a transducing position with respect to the magnetic disk and an unloaded position; and
a ramp to load and unload a transducer apparatus from a surface of the magnetic disk, said ramp comprising:
a parking surface having a first coefficient of friction; and
an inclined surface having a second coefficient of friction that is lower than the first coefficient of friction, a portion of a suspension contacting said parking surface and said inclined surface when unloading or loading the transducer apparatus with respect to the magnetic disk.

13. The information handling system of claim 12 wherein the ramp is comprised substantially from a uniform material, and said inclined surface is textured to produce the second coefficient of friction which is lower than the first coefficient of friction.

14. The information handling system of claim 12 wherein the ramp is comprised of:

a first ramp portion comprised of a first material having the first coefficient of friction associated therewith; and
a second ramp portion comprised of a second material having the second coefficient of friction associated therewith.

15. The information handling system of claim 12 wherein the inclined surface further comprises a flat surface adjacent to the parking surface and having the second coefficient of friction.

16. A method for forming a ramp in an information handling system including a base, a rotatable magnetic disk attached to the base, and a movable actuator assembly attached to the base, the actuator assembly including a transducer attached to a suspension to movably suspend the transducer from the actuator assembly near the magnetic disk, the magnetic disk to store representations of information to be written to or read from the magnetic disk by the transducer, the method comprising the steps of:
forming a parking surface of the ramp having a first coefficient of friction;
forming an inclined surface of the ramp having a second coefficient of friction that is lower than the first coefficient of friction; and
attaching the ramp to the base to contact and support the suspension as the actuator assembly loads or unloads the transducer with respect to the magnetic disk.

17. The method of claim 16 wherein the step of forming the inclined surface includes the step of molding a texturing feature into a surface corresponding to the inclined surface.

18. The method of claim 16 wherein the step of forming the parking surface includes molding a first portion of the ramp from a first material and wherein the step of forming the inclined surface includes molding a second portion of the ramp from a second material around the first portion.

19. The method of claim 16 wherein the step of forming the inclined surface further comprises forming a flat surface adjacent to the parking surface having the second coefficient of friction.

* * * * *